Aug. 31, 1943.  H. L. BOWERS ET AL  2,328,323
VALVE MECHANISM FOR WATER SOFTENERS
Filed Aug. 5, 1939

HERBERT L. BOWERS
AND ERIC PICK
INVENTORS

BY Eric Pick
ATTORNEY

Patented Aug. 31, 1943

2,328,323

UNITED STATES PATENT OFFICE 2,328,323

VALVE MECHANISM FOR WATER SOFTENERS

Herbert L. Bowers, Haworth, N. J., and Eric Pick, East Rockaway, N. Y., assignors to The Permutit Company, New York, N. Y., a corporation of Delaware Application August 5, 1939, Serial No. 288,500

4 Claims. (Cl. 277—60)

This invention relates to valve mechanism for water softeners; and it comprises a mechanism having two valves, two pipes leading to the mechanism, the valves being arranged to establish and interrupt communication between the two pipes, pressure responsive means arranged to close one of said valves when the pressure in the first pipe exceeds the pressure in the second pipe and to open said one valve when the pressure in the second pipe exceeds the pressure in the first pipe, and a float arranged to open and close the other valve; all as more fully described hereinafter and as claimed.

In zeolite water softeners hard water is softened by passage through a bed of granular zeolite. When the softening capacity of the bed is exhausted it is restored by a process known as regeneration in which brine is passed through the bed and subsequently rinsed out to waste. The brine is usually stored in a tank partly filled with salt. Upon withdrawal of the quantity of brine used in regeneration water is added to this tank to dissolve some of the salt and thus form additional brine. An injector having its suction connected through a valve to the bottom of the brine tank is used to withdraw the brine in regenerating, and frequently a separate pipe, controlled by a float valve, is used to refill the brine tank with fresh water.

In the above described arrangement the brine stands continuously in the brine pipe, thus, in time, causing corrosion. Furthermore, if either of the valves in the brine and refill pipes leaks the brine tank will eventually overflow, resulting in loss of salt.

It is one object of our invention to provide a valve mechanism which requires but a single pipe to the brine tank for both withdrawing brine and refilling the tank;

Another object is to provide a mechanism which seals the pipe leading to the brine tank effectively, thus preventing loss of salt; and A further object is to provide a mechanism by which the brine tank pipe is flushed free of brine directly after the brine has been withdrawn, thus preventing corrosion.

The manner in which the foregoing objects are achieved is shown in the accompanying drawing in which—

Figure 2:
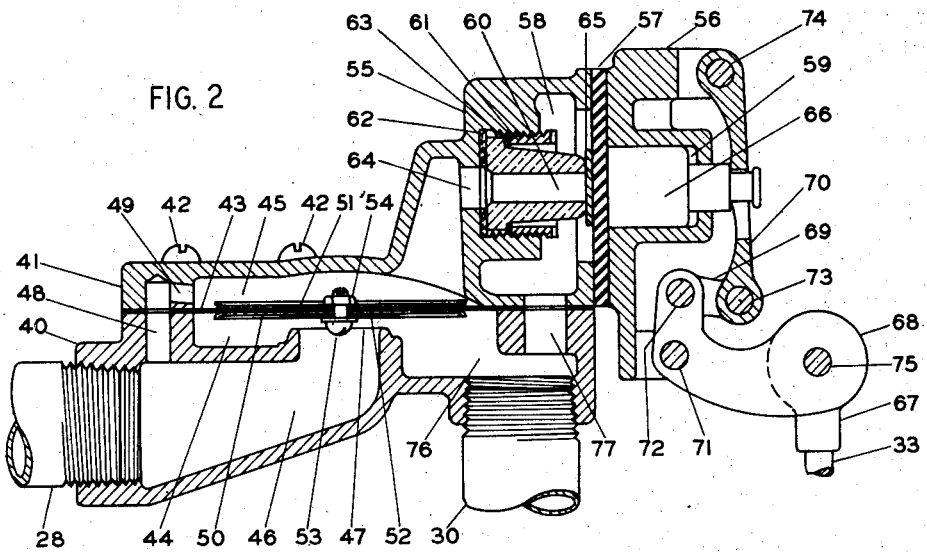
Figure 1:
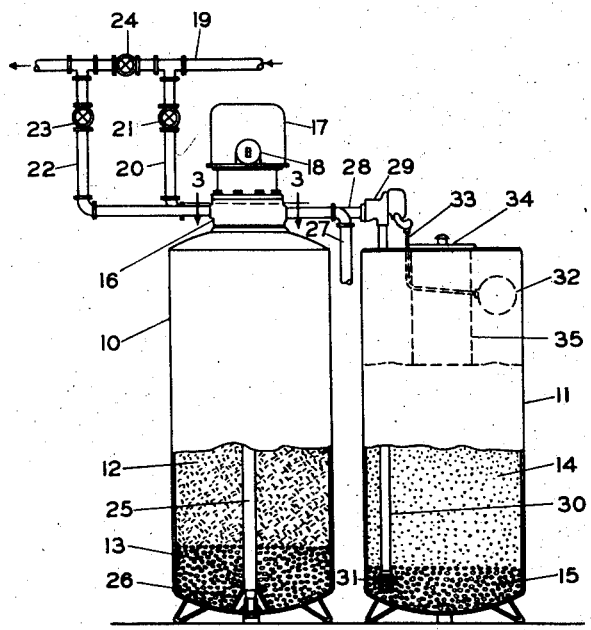

Fig. 1 is an elevation, partly in section, of a water softening apparatus including a valve mechanism according to our invention; and Fig. 2 is a section through the valve mechanism 29 of Fig. 1.

Similar numerals refer to similar parts throughout the several views.

The apparatus shown in Fig. 1 is of the general type disclosed in Pick Patent 2,052,515, dated August 25, 1936, to which reference is made for details of construction of the water softening apparatus not shown or described herein.

Referring now to Fig. 1, the apparatus comprises a water softening tank 10 and a brine tank 11. In the water softening tank 10 is a bed of zeolite 12 supported on a layer of gravel 13, and in the brine tank 11 is a quantity of salt 14 resting on a gravel layer 15. On top of tank 10 is mounted a multiport valve 16 arranged for automatic operation by a mechanism 17 provided with a starting switch 18.

A main 19 carrying water to be softened is connected to the multiport valve 16 by an inlet pipe 20 with a valve 21, and an outlet pipe 22 with a valve 23. A valve 24 in main 19, as shown, permits by-passing the water softening apparatus by opening valve 24 and closing valves 21 and 23. In normal operation valve 24 is closed and valves 21 and 23 are open. The multiport valve is furthermore connected with a pipe 25 within tank 10 and provided with a distributor 26 imbedded in gravel 13, with a waste pipe 27, and with a pipe 28 leading to a valve mechanism 29 which in turn is connected with the bottom of brine tank 11 by a pipe 30 provided with strainer 31. Within the brine tank 11 is a float 32 operatively connected with the valve mechanism 29 through a rod 33. The brine tank 11 is provided with a cover 34 and sleeve 35 for the purpose of filling the tank with salt.

The valve mechanism 29, as shown in Fig. 2 has a body 40 and a cover 41 held together by screws 42 and enclosing a chamber which is divided by a diaphragm 43 into compartments 44 and 45. Pipe 28 is screwed into body 40 and is in communication with compartment 44 through a passage 46 and a valve port 47, and with compartment 45 through passages 48 and 49. A pair of dished plates 50 and 51, and a valve disc 52 are centrally attached to diaphragm 43 by means of a screw 53 and nut 54. Cover 41 has a projection 55 to which a member 56 is attached by means of screws (not shown) forming a chamber which is divided by a diaphragm 57 into compartments 58 and 59. In compartment 58 is a valve port 60 held in place by a threaded collar 61 with interposed gaskets 62 and 63. The valve port 60 communicates with compartment 45 through a passage 64. On the diaphragm 57 is mounted, as by vulcanizing, a valve disc 65. A plunger 66 is located in compartment 59 and arranged for longitudinal movement by the float 32 through rod 33 and links 67, 68, 69 and 70, pivoted at 71, 72, 73 and 74. The rod 33 is fitted to link 67, and links 67 and 68 are rigidly connected with each other at 75. The pipe 30 is screwed into body 40 and communicates through passages 76 and 77 with compartments 44 and 58.

When the pressure in compartment 45 exceeds the pressure in compartment 44 the diaphragm 43 moves downward and presses the disc 52 against port 47, thus closing the port. On the other hand, when the pressure in compartment 45 is equal to or lower than that in compartment 44 the disc 52 is lifted and port 47 is open, as illustrated in Fig. 2.

When the float 32 rises in the tank 11 to a predetermined level it presses the disc 65 against port 60, through rod 33, links 67 to 70, and plunger 66. When the float drops below said predetermined level this pressure is released.

The diaphragms 43 and 57 and valve discs 52 and 65 are preferably made of soft rubber such as the type known as pure gum. The port 60 may be made of porcelain. For the rest, the mechanism is constructed of suitable metal, such as brass, bronze or galvanized cast iron. The disc 52 is advantageously cemented to the dished plate 50.

Operation of the apparatus is as follows: When regeneration is required the mechanism 17 is started by manually moving starting switch 18. Thereupon the mechanism operates valve 16 at a slow and steady rate. First softening is stopped and the zeolite is backwashed, as described in Patent 2,052,515 referred to above. Then the valve 16 is moved to brining position in which water is admitted to an injector within valve 16 creating a suction which is transmitted through pipe 28, and passages 48 and 49 to compartment 45. The pressure in compartment 45 becomes thus lower than the atmospheric pressure in compartment 44, so that the diaphragm 43 is lifted, raising the valve disc 52 and uncovering the valve port 47. Thereupon brine flows from brine tank 11 through strainer 31, pipe 30, passage 76, port 47, passage 46 and pipe 28 to valve 16 wherein it is diluted by the water entering the injector and then flows into the top of tank 10 and through the zeolite 12, gravel 13, distributor 26, pipe 25, valve 16, and pipe 27 to waste. As brine is being withdrawn from tank 11 the float 32 drops and releases the pressure of disc 65 against port 60, without, however, opening the port which remains closed because of the partial vacuum communicated to port 60 from pipe 28 via chamber 45. The flow of brine is interrupted after a predetermined interval of time.

The valve 16 next moves to the rinse position. Water entering valve 16 passes into the top of tank 10, downwardly through zeolite 12 and gravel 13, and then through distributor 26, pipe 25, valve 16 and pipe 27 to waste, rinsing the zeolite free of salt. At the same time water under pressure is admitted through pipe 28 to the valve mechanism 29. There the flow is divided, a portion passing through passage 46, port 47, and passage 76 into pipe 30, and the remainder of the flow passing through passages 48 and 49, chamber 45, passage 64, port 60 and passage 77 into pipe 30; the entire flow then passes down through pipe 30 and strainer 31, refilling the brine tank 11 and at the same time flushing all brine from pipe 28, the valve mechanism 29, pipe 30, and strainer 31, and also clearing the latter of any insoluble impurities collected thereon during brining. When the liquid in the brine tank rises to its normal level the float 32 through rod 33, links 67 to 70, and plunger 66, forces disc 65 against port 60. This closing of port 60 shuts off the outflow of water from chamber 45 through passage 64. Consequently, the pressure in chamber 45 rises above that in chamber 44, forcing the diaphragm 43 down so that disc 52 closes port 47, thus stopping all flow to the brine tank.

In the softening position the valve 16 does not admit water to the mechanism 29. There is therefore a double shutoff of flow to the brine tank, on the one hand in the multiport valve, as just mentioned, and on the other hand in the mechanism 29 by the closing of port 60 by the float 32, and of port 47 by the water supply pressure trapped in chamber 45. Any leakage into the brine tank during normal operation of the water softening apparatus is thus effectively prevented.

While we have shown our novel valve mechanism with particular reference to zeolite water softening apparatus, it may, of course, be used for other purposes involving periodic withdrawal of liquid from a tank with subsequent refilling of the tank. Modifications of the construction shown may be made without departing from the spirit of our invention, and reference is, therefore, made to the following claims for a definition of the scope of our invention.

We claim:

1. A valve mechanism comprising a chamber, a continuous diaphragm dividing said chamber into two compartments, a valve having a member arranged for positive movement by the diaphragm in both directions, a float, another valve arranged for actuation by said float, a pair of pipes each selectively constructed and arranged to conduct liquid to and from the valve mechanism, means establishing free communication between one of said pipes, one of said compartments and both said valves, and other means establishing free communication between the other of said pipes, the other of said compartments and both said valves.

2. A valve mechanism comprising a chamber, a diaphragm dividing the chamber into two compartments, a valve port opening into one of said compartments, a valve disc mounted on the diaphragm and adapted to open and close the valve port upon movement of the diaphragm, a second chamber, a second diaphragm subdividing said second chamber into two compartments, a second valve port leading from the second compartment of the first named chamber into one of the compartments of the second chamber, a movable member in the second compartment of the second chamber, a float adapted to move the movable member to force the second diaphragm against the second valve port so as to close the port, a pipe communicating with the first valve port and the second compartment of the first named chamber, and a pipe communicating with the first named compartments of both chambers, each of said pipes serving at times as an inlet while the other pipe is serving as an outlet.

3. A valve mechanism comprising a chamber, a diaphragm dividing the chamber into two compartments, a valve port opening into one of said compartments, a valve disc mounted on the diaphragm and arranged for movement by the diaphragm in both directions to close the valve port when the pressure in the second compartment exceeds the pressure in said one compartment, and to open the valve port when the pressure in the second compartment does not exceed the pressure in said one compartment, a pipe communicating with said one compartment, a pipe communicating with said second compartment, each of said pipes serving at times as an inlet while the other pipe is serving as an outlet, a valve arranged to establish and interrupt communication between said pipes around said port, and a float arranged to actuate said valve.

4. A valve mechanism comprising two valves each by-passing the other, a pipe communicating with both said valves, another pipe communicating with both said valves, each of said pipes serving at times as an inlet while the other pipe is serving as an outlet, pressure responsive means arranged to close one of said valves when the pressure in the first pipe exceeds the pressure in the second pipe and to open said one valve when the pressure in the second pipe exceeds the pressure in the first pipe, and a float arranged to actuate said second valve independently of said first valve.

HERBERT L. BOWERS.
ERIC PICK.